Nov. 29, 1932.  W. F. CLARK  1,889,238
SOLAR HEATER
Filed May 7, 1927  2 Sheets-Sheet 1
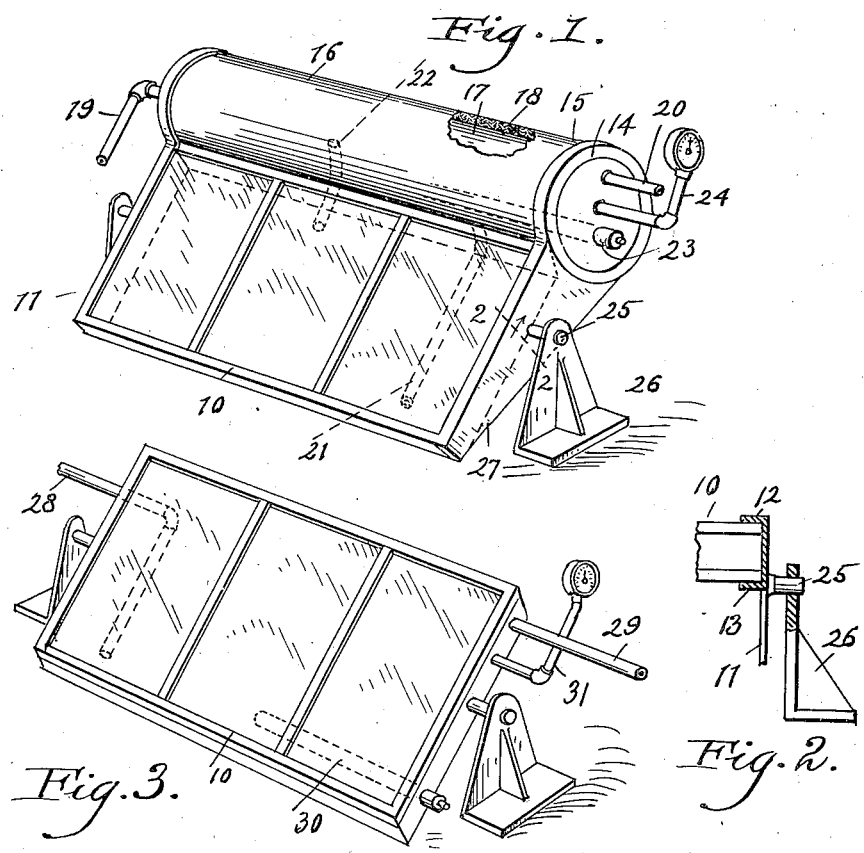
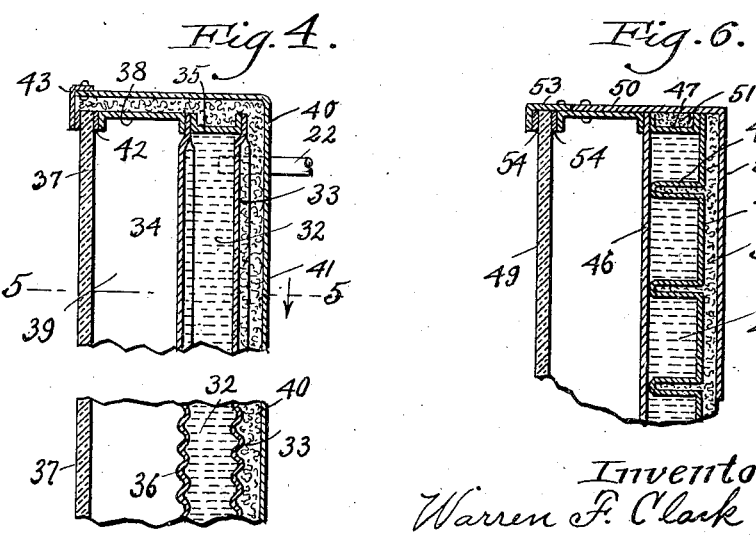
Inventor
Warren F. Clark
Knois Hudson & Kent
attys.

Nov. 29, 1932.  W. F. CLARK  1,889,238
SOLAR HEATER
Filed May 7, 1927  2 Sheets-Sheet 2
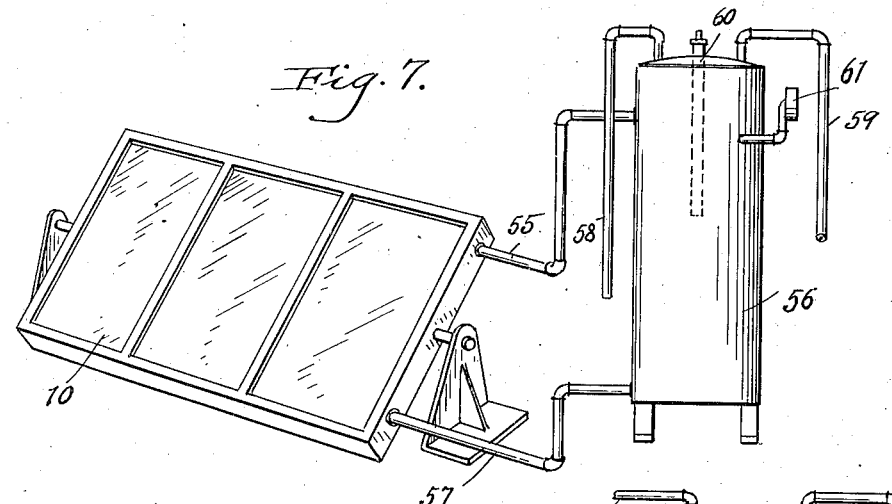
Fig. 7.
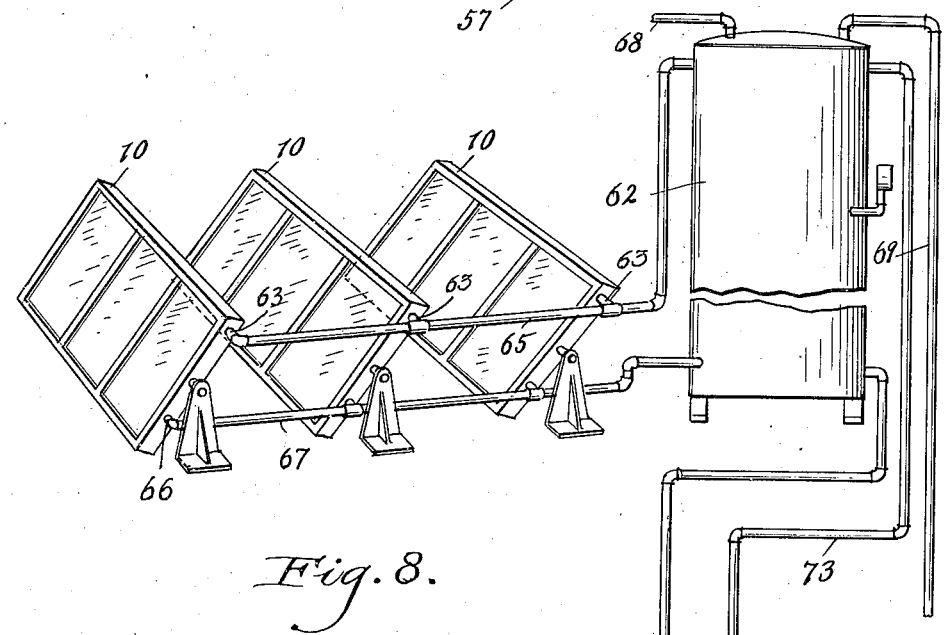
Fig. 8.
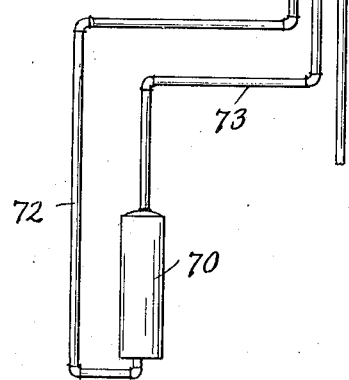

Patented Nov. 29, 1932

1,889,238

UNITED STATES PATENT OFFICE

WARREN F. CLARK, OF PHILADELPHIA, PENNSYLVANIA, ASSIGNOR TO AUTOMATIC ELECTRIC HEATER COMPANY, OF POTTSTOWN, PENNSYLVANIA, A CORPORATION OF DELAWARE

SOLAR HEATER

Application filed May 7, 1927. Serial No. 189,609.

This invention relates to solar heaters, and has primarily for its object to provide a heater which is simple and inexpensive to manufacture but exceptionally efficient in its operation and function.

Another object of the present invention is to produce a self-contained solar heater of the thermo-siphon type wherein the water is continually maintained in a heated condition.

A still further object of the invention is to provide means for maintaining the water in the system at a predetermined temperature when, for any reason, the sun is not shining or when the quantity of heated water being drawn from the system exceeds the quantity of water being heated by the sun's rays.

Another object of the invention is to provide a solar heater unit of novel structure wherein the water chamber is of an unrestricted nature and properly insulated so as to obtain the most efficient radiation for heating the water in the chamber by the sun's rays.

A still further object of the invention is to provide a heater plate having means for increasing the radiation thereof and at the same time resulting in providing the increased strength necessary to withstand the water pressure.

With the objects above indicated and other objects hereinafter explained in view, my invention consists in the construction and combination of elements hereinafter described and claimed.

Referring to the drawings:

Fig. 1 is a perspective view showing a self-contained solar heater;

Fig. 2 is a cross sectional view taken on the line 2—2 of Fig. 1, and showing the manner in which the solar heater is supported by the end frames;

Fig. 3 is a perspective view of a modified form of self-contained solar heater;

Fig. 4 is a cross sectional view of the solar heater showing the heating plate provided with vertically extending corrugations;

Fig. 5 is a cross sectional view taken on the line 5—5 of Fig. 4, and showing the arrangement of the corrugated heating plate and back plate;

Fig. 6 is a modified form of the structure showing a different manner of providing additional radiating means;

Fig. 7 is a perspective view of a solar heater similar to that shown in Fig. 3 connected to a storage tank; and Fig. 8 is a perspective view showing a plurality of solar heaters connected in series and connecting with a storage tank.

In the drawings, 10 represents a solar heater which is preferably rectangular in shape and of box-like structure, the interior of the solar heater being provided with an unrestricted water chamber adapted to contain a quantity of water to be heated by subjecting the latter to the rays of the sun for a predetermined length of time.

The detailed construction of the heater will be hereinafter more clearly described but at present it is suffice to say that the solar heater is of the thermo-siphon type wherein the cold water is delivered to the lower portion of the solar heater and when the temperature of the water is raised to a predetermined degree it will pass off by thermo-siphon action into a suitable storage tank from which it will be drawn off, as desired.

The solar heater 10 is supported between a pair of parallel end frame members 11 which are provided with inwardly extending flanges 12 and 13 within which the solar heater 10 is securely mounted. The rear portions of the end frame members 11 are provided with circular head portions 14 having a circumferential inwardly extending flange 15 within which a storage receptacle or tank 16 is securely mounted. This storage tank 16 consists of an inner metallic tank 17, of suitable capacity, adapted to contain the heated water and is entirely surrounded by insulation 18, of suitable thickness, to maintain the water within the tank 17 in a heated condition.

This construction is of importance in that it should be understood that the solar heater is placed out in the open where it is subjected to the surrounding temperature and to breezes so that it is important to prevent, as far as possible, the cooling of the water within the tank 17.

Cold water is supplied to the tank 17 by means of a pipe 19 connected to any suitable water supply while the heated water is drawn off through a pipe 20 connected within the house or at a location wherein it is desired to conduct the heated water for use. The cold water from the tank 17 is fed into the lower portion of the solar heater 10 by means of a pipe 21 and when the water within the solar heater 10 is suitably heated to a predetermined degree it passes by thermo-siphon action from the solar heater 10 back into the tank by means of the pipe 22.

It happens that in some instances it is desired to have hot water when the sun is not shining due to cloudy weather or at night after the sun has set, in which case an additional means for heating the water is provided which consists of a heating element 23 positioned within the tank 17 and supported by one of the end frame members 11. This heating element 23 is connected in a suitable electric circuit and is controlled by the thermostat 24, also supported by one of the end frame members 11 and extends into the tank 17. The heating element assists in rapidly raising the temperature of the water within the tank 17 and maintains it above a predetermined temperature in that the thermostat is adjusted to close the circuit of the heating element 23 when the temperature of the water within the tank 17 drops to a predetermined degree, and to automatically cut out the heating element 23 from the circuit when the temperature of the water in the tank 17 has been raised to a predetermined degree, above which any further heating of the water is accomplished by the action of the sun's rays upon the water contained within the solar heater 10.

The end frame members 11 are provided with laterally extending rods 25, the ends of which are suitably journaled in the upper portion of a pair of supporting brackets 26. These supporting brackets 26 are primarily used when the solar heater is to be supported upon the ground or other flat structure, but when the solar heater is mounted upon a roof or other slanting structure the angle of the lower edge 27 of the end frame members 11 is such that its engagement with the slanting roof positions the top of the solar heater in its most efficient position with respect to the rays of the sun.

In Fig. 3 a modified solar heater is illustrated, in which the hot water storage tank 16 shown in Fig. 1, is eliminated therefrom and the water either contained in the solar heater 10 or passed off into a suitable storage tank not shown located adjacent or independently thereof. The solar heater illustrated herein is of rectangular shape and box-like structure, as heretofore indicated, and is provided with a water chamber which contains a suitable quantity of water to be heated by its exposure to the rays of the sun. The solar heater 10 is supported in the same manner as the solar heater illustrated in Fig. 1 and the cold water is supplied to the solar heater 10 by means of a pipe 28 connected to any suitable source of water supply. When the water has been heated to a predetermined degree by its exposure to the rays of the sun, it passes off by thermo-siphon action through an outlet pipe 29 connected with a storage tank, if desired, or connected directly with a fitting at the point at which it is to be used such as faucets of a hot water system. In this arrangement the solar heater 10 is provided with a heating element 30 extending within the solar heater 10 and supported by the end of the solar heater. The heating element 30 is suitably connected in an electrical circuit and controlled by a thermostat 31, also supported by the end of the solar heater 10 and extending therein in engagement with the water. The thermostat 31 is adjusted so that the circuit to the heating element 30 is closed when the temperature of the water drops to a predetermined degree and opened when the temperature of the water rises to a predetermined degree. This not only furnishes hot water on occasions when the sun is not shining, due to cloudy weather or at night, but also assists in raising the temperature of the water hurriedly to a predetermined degree after which further heating of the water is effected by the action of the rays of the sun upon the water in the solar heater.

With reference to the construction of the solar heater 10, illustrated in Figs. 1 and 3, the preferred structure is disclosed in Figs. 4 and 5. The water chamber 32 is provided with a back plate 33 and a heat transmitting plate 34, the latter being of copper or other suitable heat-conducting material and these plates are suitably spaced apart and positioned parallel to each other by a channel frame member 35, suitably joined, as by welding, to the outer edges of the plates and extending entirely therearound. The heat transmitting plate 34 is provided with vertically extending corrugations 36, the purpose of which is to not only provide reinforcing means for the plate to withstand the pressure of the water within the water chamber 32, but to further give additional radiating surface to the heat transmitting plate which is subjected to the rays of the sun. The back plate 33 may also be provided with these corrugations to give strength and rigidity to the back plate, although this is not material.

The front of the solar heater has a glass cover 37 which extends entirely over the front of the solar heater 10 and is spaced from the heat transmitting plate 34 by a channel member 38 extending entirely around the outer edges of the glass 37 and plate 34 and rigidly connected to the latter by welding or any other suitable means. This construction provides an air space 39 which prevents too rapid cooling of the plate 34 but if desired the cover plate 37 may be omitted. The outer portions and the back of the solar heater are provided with sufficient insulating material 40 to prevent, as near as possible, the escape of heat from within the solar heater and to assist in the function of the solar heater. A rear cover plate 41 entirely surrounds the insulation 40 and terminates adjacent the outer edge of the glass cover 37. Suitable packing, such as felt, 42 is disposed between the channel member 38 and the front edge of the glass, and the latter is securely clamped in position by means of a clamping frame 43, bolted or otherwise secured to the rear cover member 41.

The hot water outlet pipe 22 is herein shown which, from Fig. 1, it will be noted communicates directly with the tank 17, and the cold water supply pipe 21 while not herein shown is to be understood to be connected with the lower portion of the water chamber 32 and in communication therewith.

In Fig. 3, employing the structure just described, the hot water pipe 29 would communicate with the interior of the water chamber 32 at the upper portion thereof and the cold water inlet pipe 28 would communicate with the water chamber 32 at the lower portion thereof.

In Fig. 6 a modified structure is herein illustrated, the principle of which, however, is the same as that just described. The back plate is indicated at 44 and is provided with a plurality of tubular extensions 45 formed integrally therewith to the outer ends of which is preferably welded, or otherwise suitably connected, the heat transmitting plate 46. At the outer edges of the back plate 44 and plate 46 extends a channel-shaped frame member 47 welded thereto, or otherwise suitably secured, which extends entirely around the plates and forms the water chamber 48. The glass cover 49 extends entirely across the front of the solar heater 10 and is spaced from the plate 46 by a channel frame member 50 welded, or otherwise secured, to the plate. Insulation 51 entirely covers the back and a portion of the sides and ends and a rear cover member 52 entirely encloses the insulation and to suitably insulate the water chamber extends substantially into engagement with the channel member 50, to which it is bolted or otherwise secured. A rectangular clamping member 53 rigidly supports the glass cover 49 against the channel member 50 and is bolted or otherwise secured to the latter. Felt packing 54 is positioned between the flange of the rectangular clamping member 53 and the leg of the channel member 50 so as to form an air-tight joint and prevent the glass from being broken.

Referring to Fig. 3 and the structures disclosed in Figs. 4 and 6, it should be understood that the heating element 30 is disposed within the water chamber 32 or 48 as well as the arm of the thermostat 31 so that the heating element and arm are in direct contact with the water within the respective chambers.

In Fig. 7 I have illustrated a solar heater 10 of a construction disclosed in Figs. 4 and 6 which is provided with a hot water outlet pipe 55 connecting with a storage tank 56 supported upon a roof adjacent to the solar heater 10 and may be supported within the customary chimney upon the roof which is not herein shown. A cold water supply pipe 57 connects with the water chamber of the solar heater 10 and with the tank 56 which constitutes substantially an open system. When the water within the water chamber of the solar heater 10 is heated by the rays of the sun to a predetermined degree, it passes off through the pipe 55 by thermo-siphon action to the tank 56 and fresh cold water is conducted to the water chamber of the solar heater 10 from the tank 56 through the pipe 57. The water within the tank is thus maintained at a substantially constant temperature. The tank 56 is supplied with water by a cold water pipe 58 connected to the tank and connecting with any suitable source of water supply, while the hot water is withdrawn from the tank through a pipe 59 leading to the house or other place in which it is to be used. As a means for supplying hot water at times when the sun is not shining, such as cloudy days, for instance, a heating element 60 is supported by the upper end of the tank 56 and extends within the receptacle into engagement with the water. This heating element 60 is connected to a suitable electric circuit which is controlled by the thermostat 61, suitably supported upon the tank 56. When the water within the tank drops to a predetermined degree, the thermostat acts to close the circuit to the heating element 60 and the temperature of the water raised to a predetermined degree, at which time the thermostat 61 acts to break the circuit to the heating element 60. It is desirable that the heating element 60 be supported from the top of the receptacle 56 so that easy access is afforded for repairing the heating element 60 or substituting an entirely new element in case of injury.

In the solar heaters heretofore illustrated, a single heater has been employed for heating a quantity of water and storing the same in a tank for future use, but it should be understood that a plurality of these solar heaters 10 may be connected in series, as is shown in Fig. 8. This provides a means for furnishing apartments, for instance, with water heated in a system of this nature.

The hot water tank is indicated at 62 and is of a sufficient capacity to maintain the desired quantity of water necessary for the needs of the apartment. Each of the solar heaters 10 has outlet pipes 63 for the hot water which has been heated within the solar heater and these pipes are connected by a pipe 65 to the upper portion of the tank 62. The lower portion of the solar heaters 10 are provided with inlet pipes 66 which connect with a water supply pipe 67 connected to the lower portion of the tank 62.

It will, therefore, be noted that this arrangement affords substantially an open system and the water which is heated within the solar heaters by the action of the sun's rays is transmitted to the tank 62 by a thermosiphon action. A cold water supply pipe 68 is connected to the tank 62 for furnishing the latter with fresh water and is also connected to any suitable means of water supply. The hot water outlet pipe 69 is shown connected to the tank 62 and connects with the apartments or the place at which the heated water is to be used. The heating element 70, either electric or otherwise, is provided for heating the water within the tank 62 when the rays of the sun are not sufficient to supply the necessary heat. This heating element 70 is controlled by a thermostat 71 supported upon the tank and is adapted to control the circuit for actuating the heating element 70. The cold water from the tank 62 is fed by means of a pipe 72 to the lower part of the heating element 70 and the heated water which has been heated by its passage through the heating element 70, is returned to the upper portion of the tank 62 by a hot water return pipe 73. The thermostat 71 is adjusted to close the circuit to the heating element 70 when the water within the tank drops to a predetermined degree and to break the circuit to the heating element when the water within the tank 62 is raised to a predetermined degree.

While I have disclosed the preferred construction of the solar heater and the system in connection therewith, it is to be understood that I am not to be limited to the precise construction described, but may resort to changes without departing from the scope of the invention as defined in the appended claims.

Having thus described my invention, I claim:

1. In a solar heater, a water receptacle adapted to contain a quantity of water to be heated by the rays of the sun, a storage tank adapted to contain the heated water, side members for supporting said receptacle and tank, said tank having an inlet for supplying water thereto, said tank having an outlet through which the heated water is withdrawn, means for conducting cold water from said tank to said receptacle, and means for conducting heated water from said receptacle to said tank.

2. In a solar heater, a water receptacle adapted to contain a quantity of water to be heated by the rays of the sun, a storage tank adapted to contain the heated water, side members for supporting said receptacle and tank, means for pivotally supporting said side members, said tank having an inlet for supplying water thereto, said tank having an outlet through which the heated water is withdrawn, means for passage of cold water from said tank to said receptacle, and means for passage of heated water from said receptacle to said tank.

In testimony whereof, I hereunto affix my signature.

WARREN F. CLARK.